(12) United States Patent
Dorband et al.

(10) Patent No.: US 11,888,425 B2
(45) Date of Patent: Jan. 30, 2024

(54) METHOD FOR CONTROLLING OPERATION OF AN ELECTRICAL MACHINE

(71) Applicant: ZF FRIEDRICHSHAFEN AG, Friedrichshafen (DE)

(72) Inventors: Felix Dorband, Schonungen (DE); Alfred Tareilus, Schweinfurt (DE); Hans-Dieter Endres, Volkach (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 17/941,150

(22) Filed: Sep. 9, 2022

(65) Prior Publication Data
US 2023/0083579 A1    Mar. 16, 2023

(51) Int. Cl.
*H03K 7/08*     (2006.01)
*H02P 29/024*   (2016.01)
*H02P 27/06*    (2006.01)

(52) U.S. Cl.
CPC ............ *H02P 29/024* (2013.01); *H02P 27/06* (2013.01)

(58) Field of Classification Search
CPC .......... H02P 29/024; H02P 27/06; H02P 3/22; H02P 27/08
See application file for complete search history.

(56) References Cited

U.S. PATENT DOCUMENTS

| 6,541,925 | B1* | 4/2003 | Chang ................... H02M 7/538 |
| | | | 315/307 |
| 2010/0164563 | A1* | 7/2010 | Bea .......................... H03K 4/06 |
| | | | 327/134 |
| 2020/0059180 | A1* | 2/2020 | Dixon ................. H02P 21/0003 |

* cited by examiner

*Primary Examiner* — Muhammad S Islam
(74) *Attorney, Agent, or Firm* — Cozen O'Connor

(57) ABSTRACT

Method for controlling operation of an electrical machine, in particular of an electrical machine of a motor vehicle, an operating state of the electrical machine being switched between an active short circuit mode and at least one further operating mode. When switching between the short circuit mode and the at least one further operating mode, a duty factor of an operating signal, in particular of a PWM signal, of the electrical machine is changed in a ramp-shaped manner at least in sections.

14 Claims, 3 Drawing Sheets

METHOD FOR CONTROLLING OPERATION OF AN ELECTRICAL MACHINE

BACKGROUND OF INVENTION

1. Field of the Invention

The disclosure relates to a method for controlling operation of an electrical machine, in particular of an electrical machine of a motor vehicle, an operating state of the electrical machine being switched between an active short circuit mode and at least one further operating mode.

2. Description of Related Art

Methods for controlling the operation of electrical machines, in particular of electrical machines of motor vehicles, are known in principle from the prior art. An electrical machine can be controlled or operated in different operating states, depending on which operating situation or power requirement is currently present. In particular, an active short circuit mode is known, into which the electrical machine can be moved as required or out of which the electrical machine can be switched into another operating mode. If a fault occurs, for example, in the electrical machine or the control device thereof, the active short circuit mode can be used to transfer the electrical machine into a safe state.

Usually when switching is performed out of normal operation into the active short circuit mode, a typical oscillating phase current arises over the, usually three, motor phases and the associated closed switches of the inverter as a function of speed. At the moment of switching-over, i.e. at the moment when the operating mode is switched into the active short circuit mode, a transient settling process takes place. During the transient settling process, current spikes of the phase currents which can significantly exceed the phase current amplitude in the settled state can occur. Depending on the design of the electrical machine, such current spikes can lead to damage, in particular premature aging of electrical components, or even to destruction of individual components. In addition, it is likewise possible for the generated magnetic fields to lead to demagnetization of permanent magnets of the electrical machine, in particular of a permanently excited synchronous machine.

In particular, operating situations can occur in which a complete function of the control of the electrical machine is no longer available. In the case of such faults, it is consequently not possible to adjust the phase currents of the electrical machine exactly before the operating mode is switched in order to avoid the occurrence of such phase currents or current spikes. In addition, operations for switching the operating mode, which start from the active short circuit mode are likewise known. Here, feedback into the intermediate circuit or into an electrical energy store can occur, for example when switching into an inverter off-state. When the bridge switches are opened, the energy stored in the inductance of the electrical machine can be dissipated via the free-wheeling diodes of the inverter. This can lead to a harmful excessive increase in voltage.

SUMMARY OF THE INVENTION

An object of one aspect of the invention is to specify a method for controlling operation of an electrical machine that is improved by comparison.

As described, one aspect of the invention relates to a method for controlling operation of an electrical machine, the operating state of the electrical machine being switched or being able to be switched between an active short circuit mode and at least one further operating mode. In other words, switching can be performed from the active short circuit mode into a further operating mode or switching can be performed from a further operating mode into the active short circuit mode. The invention is based on the knowledge that, when switching between the short circuit mode and the at least one further operating mode, a duty factor of an operating signal, in particular of a PWM signal, of the electrical machine is changed in a ramp-shaped manner at least in sections.

The duty factor of the operating signal is understood to mean in particular the so-called "duty cycle" of a PWM signal, that is to say in particular the ratio between the switched-on and switched-off state of the individual switches of the inverter. Instead of carrying out switching suddenly or instantly, the duty factor of the operating signal is changed in a ramp-shaped manner at least in sections. The ramp-shaped change thus means a gradual change of the duty factor in at least one section or over a plurality of switching periods. Here, the duty factor can be changed suddenly or in a plurality of steps or stages, which are each at least one switching period long, or can be changed continuously over individual cycles. The ramp-shaped change thus provides a step-wise or continuous change over a plurality of switching cycles. The instantaneous switching-over from a further operating mode into the active short circuit mode or from the active short circuit mode into the further operating mode, that is to say shifting within a cycle, is in particular not deemed to be a ramp-shaped change.

The negative effects described above, in particular the generation of current spikes, are substantially reduced or completely prevented by the ramp-shaped change of the duty factor at least in sections. In particular, harmful current spikes can be prevented such that the service life of the electrical machine and of the control device assigned thereto, in particular of the inverter, can be significantly increased. Destruction of individual components of the electrical machine and of the assigned control device can likewise be prevented.

As described, any switching operations between the active short circuit mode and at least one further operating mode are possible. As at least one further operating mode, normal operation, in particular clocked operation, and/or at least off-state operation, in particular an inverter off-state, can for example be carried out. In the normal operation, the operation of the electrical machine can be based on clocked operation, in particular the electrical machine can be operated in PWM operation. Starting from the normal operation, switching into the active short circuit mode is thus possible. Switching can likewise be performed out of the active short circuit mode into the normal operation. Similarly, it is likewise possible to switch out of the inverter off-state into the active short circuit mode or out of the active short circuit mode into the inverter off-state. During the respective transitions out of the active short circuit mode or into the active short circuit mode, as described above, the duty factor of the operating signal, in particular the duty factor of the PWM signal, can be changed in a ramp-shaped manner at least in sections.

As described, when switching between the at least one further operating mode and the active short circuit mode, the duty factor is changed in a ramp-shaped manner at least in sections. According to one embodiment, when switching into the active short circuit mode, the duty factor can be increased in a rising manner from a start value to an end value. If switching is thus performed from the further operating mode into the active short circuit mode, i.e. switching into the active short circuit mode is carried out, the duty factor is increased between the start value and the end value. Switching out of the further operating mode into the active short circuit mode can also be referred to as initiation. Starting from the start value, the duty factor can thus be increased in a rising manner until the end value is reached. The active short circuit mode can thus be initiated, with it being possible for the duty factor to be increased in a rising manner, for example between 0% and 100%. As already described, the duty factor can be changed in a step-wise or continuous manner Here, individual elements of the duty factor can be carried out per switching cycle or intervals of switching cycles can be defined, in which the duty factor can be increased arbitrarily in order to allow the duty factor to rise in a ramp-shaped manner from start value to end value.

According to one further aspect, provision can be made for switching out of the active short circuit mode, in particular into off-state operation, to be carried out, with the duty factor being reduced in a falling manner from a start value to an end value. According to this aspect, switching is performed out of the active short circuit mode into the at least one further operating mode. Switching out of the active short circuit mode can thus also be referred to as termination. Here, the duty factor can accordingly be reduced in a ramp-shaped manner, for example from a start value of the duty factor of 100% to an end value of the duty factor of 0%. Here, the steps or the stages can be changed arbitrarily. For example, a defined change per clock cycle or switching cycle can be provided. The start values and end values can furthermore be chosen arbitrarily.

According to one aspect of the method, the ramp-shaped change can be carried out linearly or non-linearly, in particular in a temporally varying manner and/or as a function of speed. As already described, a ramp-shaped change is generally understood to mean a change of the duty factor in a plurality of steps or continuously such that the duty factor is not changed suddenly when the operating mode is switched. Here, a linear change can substantially involve a uniform change of the duty factor over a plurality of switching cycles. A non-linear change can likewise be provided. Here, an increment of the change of the duty factor can for example be chosen to be different for different switching cycles. For example, the change can initially be carried out in larger steps and subsequently in smaller steps, or initially in smaller steps and subsequently in larger steps. The ramp-shaped change can change over time. The speed of the rotor of the electrical machine can likewise be included in the ramp-shaped change such that the ramp-shaped change can be chosen or set as a function of the prevailing speed of the electrical machine. For example, an increase of the ramp can be set based on the prevailing speed.

As described above, the start value and the end value for the ramp-shaped change can in principle be chosen arbitrarily. Here, provision can in particular be made, when the active short circuit mode is initiated, for a start value of the ramp-shaped change to be chosen to be equal to 0 or unequal to 0 and/or for an end value of the ramp-shaped change to be chosen to be equal to 1 or unequal to 1. In other words, it is possible to choose the start value at which the ramp-shaped change of the duty factor is begun. Here, the ramp-shaped change can for example begin at 0% or a start value that is unequal to 0 can be chosen. The end value of the ramp-shaped change can likewise be chosen, for example the ramp-shaped change can be terminated only at 100% or an end value below 100% can be set.

Furthermore, when the active short circuit mode is terminated, a start value of the ramp-shaped change can be equal to 1 or unequal to 1 and/or an end value of the ramp-shaped change can be equal to 0 or unequal to 0. Similarly to the initiation of the active short circuit mode described above, the start value and end value can thus be chosen arbitrarily. For example, when the active short circuit mode is initiated, start values of between 40 and 70% can be chosen. The end value can accordingly be chosen to be <100%, for example between 70% and 85%. For the termination, the reverse values arise, i.e. an end value of between 40 and 70% of the duty factor and a start value of between 70 and 85% can accordingly be chosen.

The method described herein can furthermore be developed in a way that, before the operating state is switched, an intermediate state is occupied, in which intermediate state three of six switches of the inverter are permanently open and the other three switches are operated in a clocked manner Here, a first and a second intermediate state can be occupied, depending on which of the switches are intended to be operated in a clocked manner and which switches are intended to remain permanently open. As known in the prior art, three of the six switches of the inverter can be referred to as so-called "high-side" switches and three of the six switches can be referred to as so-called "low-side" switches, or can be assigned to these groups. Depending on whether the first intermediate state or the second intermediate state is intended to be used, either the high-side switches or the low-side switches or generally a first group of switches or a second group of switches can be permanently open and the others can be accordingly operated in a clocked manner.

According to one further aspect of the method, the operating state can be switched into the active short circuit mode on the basis of a detected fault state. As described at the beginning, in the case of corresponding fault states, not all functions of the electrical machine and of the control device assigned thereto are often available. For example, if at least one sensor fails, in particular a current sensor, a rotor position sensor or a temperature sensor, switching can be performed into the active short circuit mode. If a corresponding fault state is thus detected, the operating state can be switched into the active short circuit mode, in particular in the form of initiation of the active short circuit mode, even if the functional capability of the system has been impaired. Switching of the operating state into the active short circuit mode can in particular be carried out without sensors. Here, the change of the duty factor can be predefined directly, in particular in the form of a static ramp.

In addition, one aspect of the invention relates to a control device for controlling operation of an electrical machine, in particular of an electrical machine of a motor vehicle, which control device is designed to switch an operating state of the electrical machine between an active short circuit mode and at least one further operating mode, wherein the control device is designed, when switching between the short circuit mode and the at least one further operating mode, to change a duty factor of an operating signal, in particular of a PWM signal, in a ramp-shaped manner at least in sections. The control device is in particular designed to perform the method as described above. The control device can in particular comprise all the devices that are needed to operate the electrical machine. An inverter can for example be understood to be part of the control device. The control device can provide the electrical energy supply for the electrical machine. For example, the electrical machine can be connected or connectable to an electrical energy store during operation. Furthermore, the invention relates to a motor vehicle comprising an electrical machine and a control device as described above.

All advantages, details and features which have been described with respect to the method are fully transferrable to the control device and the motor vehicle.

BRIEF DESCRIPTION OF THE DRAWINGS

The invention is explained below on the basis of exemplary embodiments with reference to the figures. The figures are schematic representations and show.

DETAILED DESCRIPTION OF THE PRESENTLY PREFERRED EMBODIMENTS

Figure 1:
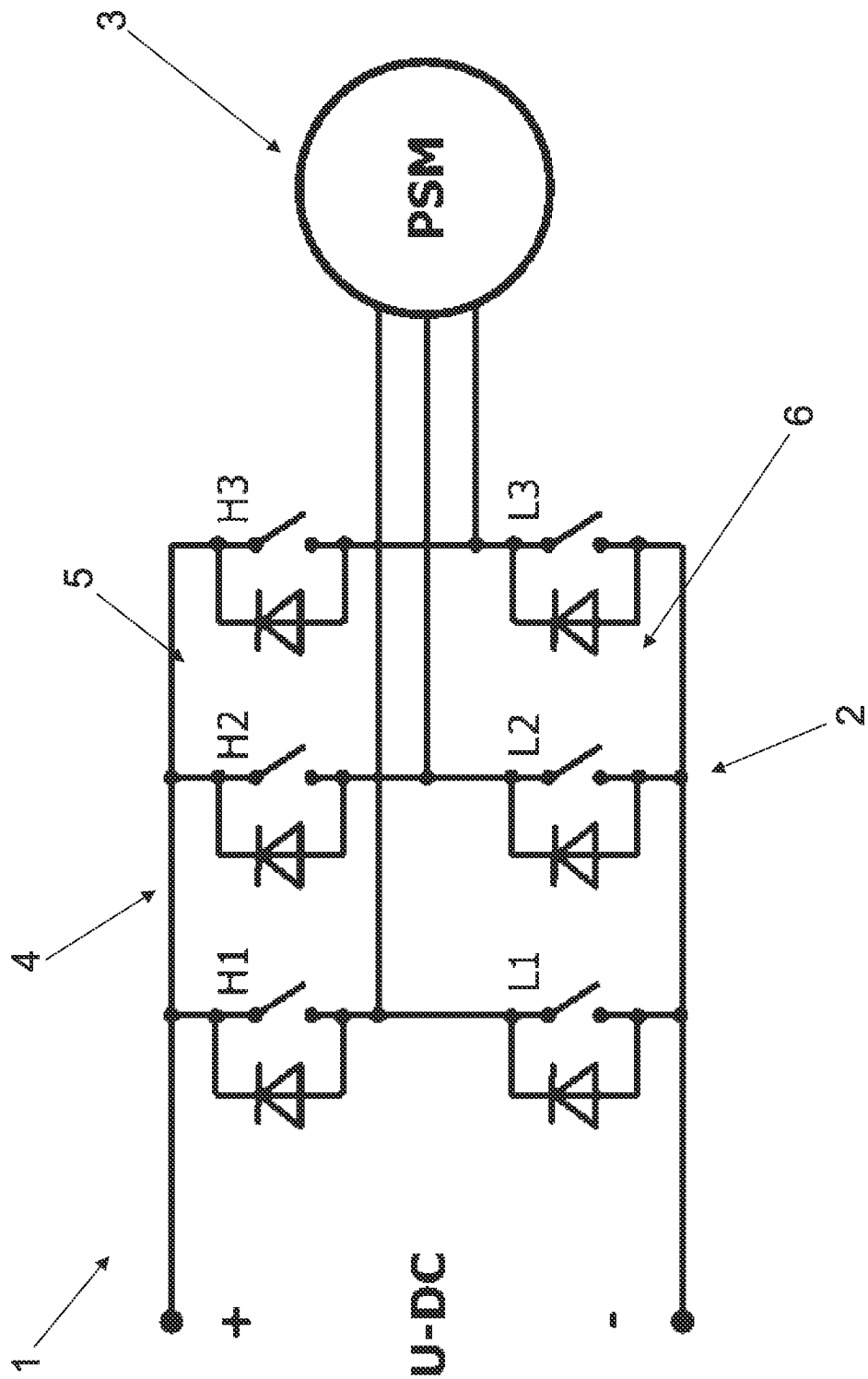
FIG. 1 is a motor vehicle comprising an electrical machine and a control device.

FIG. 1 shows a schematic detail of a motor vehicle 1 having a control device 2 and an electrical machine 3. The control device 2 has, among other things, an inverter 4, which has a first group 5 of switches and a second group 6 of switches, it being possible for the switches in the first group 5 to also be referred to as high-side switches and for the switches in the second group 6 to also be referred to as low-side switches.

Depending on the operating state of the electrical machine 3, the individual switches in the groups 5, 6 are open or closed. Here, the electrical machine 3 can be operated in particular in a normal state, in which clocked operation is present. Here, a duty factor determines in each case the opening state of the individual switches in the groups 5, 6 and thus the operating parameters of the electrical machine 3, for example the operating voltage and the operating current. In other words, PWM operation can be carried out in the normal state, the duty factor describing the so-called "duty cycle".

Figure 2:
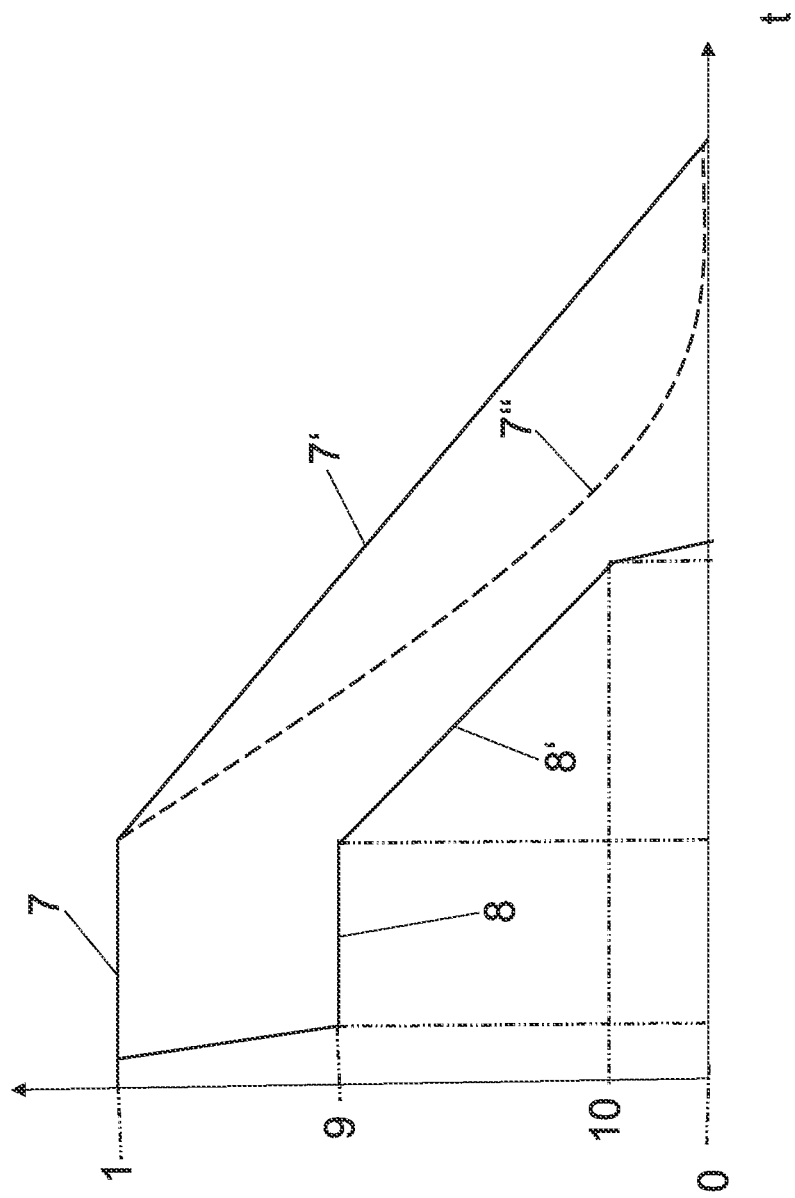
FIGS. 2, 3 is a graph of a duty factor over time.

FIG. 2 shows a schematic graph, in which, starting from normal operation, switching is intended to be performed into an active short circuit mode. The schematic graph shows the duty factor over time t. For this purpose, a curve 7 is initially illustrated which, before the operating state is switched, starts from an exemplary duty factor of 1. Here, starting from the duty factor of 1, the duty factor is reduced to 0 in a ramp-shaped manner in accordance with curve 7'. The ramp shape is illustrated linearly once in curve 7', a non-linear profile being illustrated by curve 7" as an alternative. The profiles of the curves 7', 7" are to be understood as entirely exemplary such that the precise profile or the precise ramp shape can be adapted, in particular linearly or non-linearly, depending on the prevailing operating situation. For example, the ramp shape can be chosen as a function of the speed of the rotor of the electrical machine 3 or can vary temporally.

Differing from the change of the duty factor illustrated by curve 7, the duty factor can also be changed based on curve 8. For this purpose, the start value is in particular changed. This means that, for the ramp-shaped change, a start value 9 that is unequal to 1 or that is unequal to the original duty factor is initially chosen. The start value 9 can be, for example, between 50 and 95%, in particular 70%, of the original duty factor or 0.7. FIG. 2 likewise illustrates that an end value 10 differing from 0 can also be chosen, for example between 0 and 50%, in particular 30% or 0.3.

In other words, in accordance with curve 8 differing from the original duty factor, the ramp-shaped change can initially predefine a start value 9 and an end value 10, between which the ramp-shaped change is undertaken in accordance with curve 8'. Corresponding to the ramp-shaped change illustrated by curve 8', the duty factor can in turn be changed linearly or non-linearly, for example analogous to curve 7', 7". Upon reaching the end value 10, it is possible to transition into the active short circuit mode. FIG. 2 thus shows initiation of the active short circuit mode out of normal operation. The active short circuit mode can be initiated out of various other further operating modes.

Figure 3:
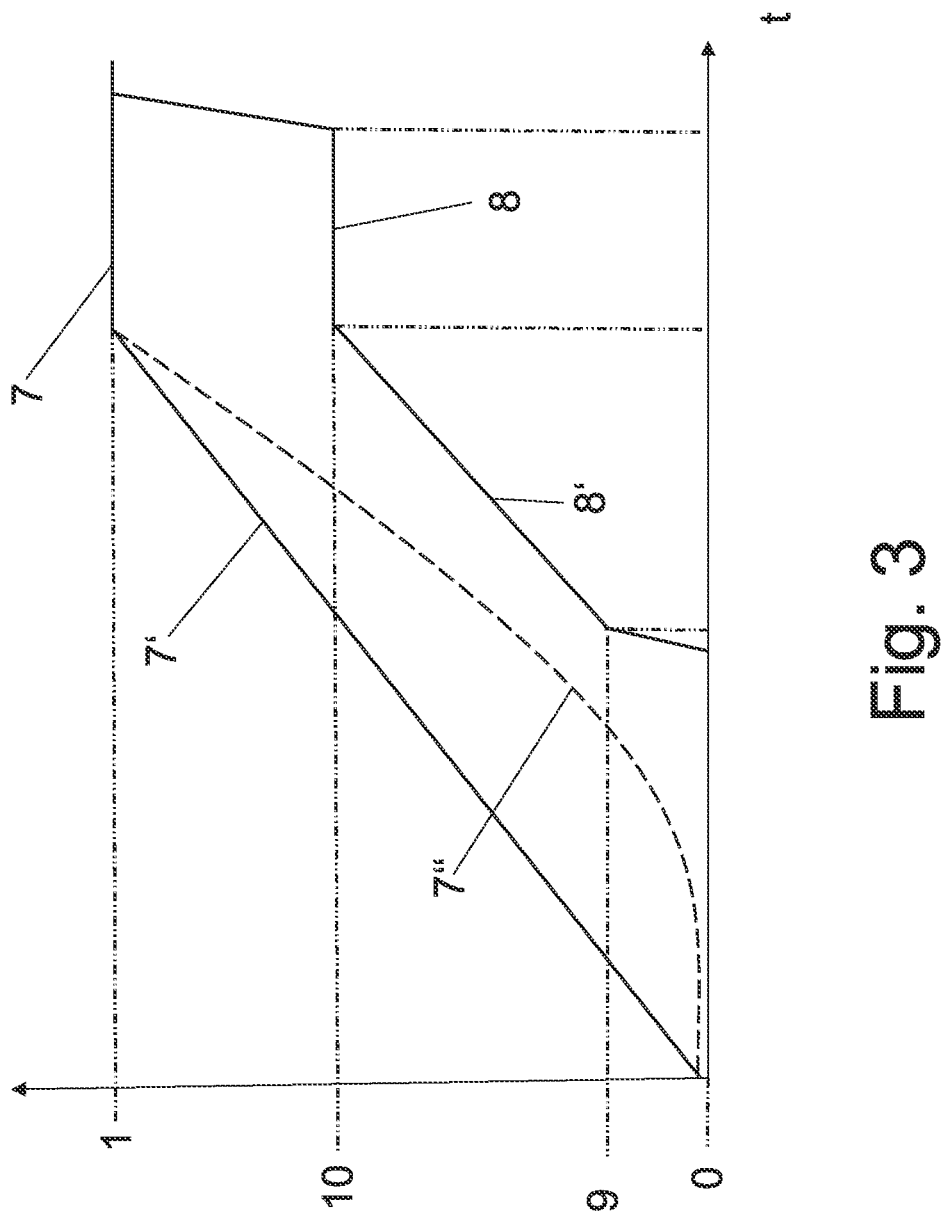

FIG. 3 shows termination of the active short circuit mode, i.e. when it is intended to transition from the active short circuit mode into a further operating mode. For example, it is possible to transition from the active short circuit mode into an inverter off-state. Evidently, in a first example, the duty factor can be increased continuously, starting from 0, up to an end value, for example 1, i.e. 100% duty factor, denoted in turn by curve 7. Here, the ramp shape can in turn be chosen to be linear or non-linear, which is illustrated purely by way of example by curve 7', 7".

It is likewise possible to define the start value 9 and the end value 10 arbitrarily, for example to use a start value 9 of 30% and an end value 10 of 80%. As is illustrated by curve 8, a ramp shape can extend between the start value 9 and the end value 10 in accordance with curve 8'. This means that, starting from the active short circuit mode, a duty factor having the start value 9 is used, which duty factor can be changed in a ramp-shaped manner in accordance with curve 8' until the duty factor reaches the end value 10. Subsequently, it is possible to transition out of the active short circuit mode into the further operating mode, for example an inverter off-state. Here, differing from curve 8', a non-linear profile can also be used, for example in accordance with curve 7".

In the ramp-shaped changes according to FIGS. 2, 3, provision can additionally be made, before the operating state is switched, for an intermediate state to be occupied. Here, the clocked operation, for example with the previous duty factor, can be maintained, the switches of the inverter 4 being otherwise controlled. For example, provision can be made for the switches in the first group 5 to remain permanently open while the switches in the group 6 are operated in a clocked manner, in order to reach the corresponding duty factor. Alternatively, provision can likewise be made for the switches in the second group 6 to remain permanently open and for the switches in the group 5 to be operated in a clocked manner Here, the duty factor, as illustrated in FIGS. 2, 3, can be changed in a ramp-shaped manner in order to improve the transition into the active short circuit mode or out of the active short circuit mode.

The advantages, details and features shown in the individual exemplary embodiments can be combined with each other, interchanged for each other and transferred to each other as required.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling operation of an electrical machine, comprising:
   switching an operating state of the electrical machine between an active short circuit mode and at least one further operating mode; and
   changing a duty factor of an operating signal in a ramp-shaped manner at least in sections when switching between the active short circuit mode and the at least one further operating mode.

2. The method as claimed in claim 1, wherein, the at least one further operating mode comprises at least one of:
   normal operation,
   a clocked operation,
   an off-state operation, and
   an inverter off-state.

3. The method as claimed in claim 1, wherein switching into the active short circuit mode is carried out, with the duty factor being increased in a rising manner from a start value to an end value.

4. The method as claimed in claim 1, wherein switching out of the active short circuit mode into an off-state operation is carried out with the duty factor being reduced in a falling manner from a start value to an end value.

5. The method as claimed in claim 1, wherein the ramp-shaped change is carried out linearly or non-linearly.

6. The method as claimed in claim 1, wherein,
   when the active short circuit mode is initiated, at least one of:
      a start value of the ramp-shaped change is equal to zero or unequal to zero and
      an end value of the ramp-shaped change is equal to one or unequal to one and/or,
   when the active short circuit mode is terminated, at least one of:
      a start value of the ramp-shaped change is equal to one or unequal to one and
      an end value of the ramp-shaped change is equal to zero or unequal to zero.

7. The method as claimed in claim 1, wherein, before the operating state is switched, an intermediate state is occupied, in which intermediate state three of six switches of an inverter are permanently open and the other three switches are operated in a clocked manner.

8. The method as claimed in claim 1, wherein the operating state is switched into the active short circuit mode based on a detected fault state.

9. The method as claimed in claim 1, wherein the electrical machine, is an electrical machine of a motor vehicle.

10. The method as claimed in claim 1, wherein the operating signal is a PWM signal.

11. The method as claimed in claim 1, wherein the ramp-shaped change is carried out in a temporally varying manner and/or as a function of speed.

12. A control device configured to control operation of an electrical machine, of a motor vehicle, the control device configured to:
   switch an operating state of the electrical machine between an active short circuit mode and at least one further operating mode; and
   change a duty factor of an operating signal in a ramp-shaped manner at least in sections when switching between the active short circuit mode and the at least one further operating mode.

13. The control device as claimed in claim 2, wherein the operating signal is a PWM signal.

14. A motor vehicle comprising an electrical machine and a control device configured to control operation of an electrical machine, of a motor vehicle, the control device configured to:
   switch an operating state of the electrical machine between an active short circuit mode and at least one further operating mode; and
   change a duty factor of an operating signal in a ramp-shaped manner at least in sections when switching between the active short circuit mode and the at least one further operating mode.

* * * * *